(12) United States Patent
Apgar et al.

(10) Patent No.: US 8,199,493 B2
(45) Date of Patent: Jun. 12, 2012

(54) ROTATIONAL APPARATUS FOR COMMUNICATION

(75) Inventors: Jeffrey Apgar, Escondido, CA (US); Huan-Sheng Hwang, San Diego, CA (US); Edward Liljegren, San Diego, CA (US); Lizhi Zheng, San Diego, CA (US)

(73) Assignee: Nokia Corporation, Espoo (FI)

( * ) Notice: Subject to any disclaimer, the term of this patent is extended or adjusted under 35 U.S.C. 154(b) by 301 days.

(21) Appl. No.: 12/583,505

(22) Filed: Aug. 20, 2009

(65) Prior Publication Data

US 2011/0043970 A1   Feb. 24, 2011

(51) Int. Cl.
  *G06F 1/16* (2006.01)
(52) U.S. Cl. ......... 361/679.57; 361/679.55; 361/679.56; 361/679.58; 455/575.1; 455/575.3; 455/575.7
(58) Field of Classification Search ............. 361/679.27, 361/679.58, 755
  See application file for complete search history.

(56) References Cited

U.S. PATENT DOCUMENTS

| | | | | |
|---|---|---|---|---|
| 5,657,258 | A * | 8/1997 | Grewe et al. ............ | 361/679.27 |
| 6,151,486 | A * | 11/2000 | Holshouser et al. ....... | 455/575.3 |
| 7,225,004 | B2 * | 5/2007 | Saito et al. ................ | 455/575.7 |
| 7,313,422 | B2 * | 12/2007 | White et al. ............... | 455/575.1 |
| 7,457,650 | B2 * | 11/2008 | Iwai et al. ................. | 455/575.7 |
| 7,535,722 | B2 * | 5/2009 | Nord ........................ | 361/755 |
| 7,751,860 | B2 * | 7/2010 | Symons et al. ........... | 455/575.3 |
| 2003/0117324 | A1 * | 6/2003 | Iwai et al. ................. | 343/702 |
| 2003/0148784 | A1 * | 8/2003 | Sawamura et al. ........... | 455/550 |
| 2004/0106428 | A1 * | 6/2004 | Shoji ......................... | 455/550.1 |
| 2005/0049017 | A1 * | 3/2005 | Yoda ......................... | 455/575.1 |
| 2006/0194462 | A1 | 8/2006 | Hashizume .................. | 439/164 |
| 2008/0143609 | A1 | 6/2008 | Mashima et al. ............ | 343/702 |
| 2008/0254843 | A1 * | 10/2008 | Maenpaa ................... | 455/575.3 |
| 2009/0316340 | A1 * | 12/2009 | Mitamura et al. ....... | 361/679.01 |
| 2010/0331059 | A1 * | 12/2010 | Apgar et al. .............. | 455/575.1 |

FOREIGN PATENT DOCUMENTS

| | | |
|---|---|---|
| EP | 1 638 213 A1 | 3/2006 |
| EP | 1 753 209 A1 | 2/2007 |

* cited by examiner

*Primary Examiner* — Anthony Q Edwards
(74) *Attorney, Agent, or Firm* — Harrington & Smith (57) ABSTRACT

An apparatus including: a first housing and a second housing joined at a joint that is configured to enable relative rotational movement of the first housing and the second housing. The first housing includes a first grounded portion and a first coupling element. The second housing includes a second grounded portion and a second coupling element. The apparatus has a first configuration in which the first housing and the second housing have been rotated to a first relative orientation at which the first coupling element and the second coupling element are aligned and a radio frequency current path is formed between the first grounded portion and the second grounded portion via the first coupling element and the second coupling element. The apparatus has a second configuration in which the first housing and the second housing have been rotated to a second relative orientation at which the first coupling element and the second coupling element are not aligned and the radio frequency current path is not formed between the first grounded portion and the second grounded portion via the first coupling element and the second coupling element.

19 Claims, 4 Drawing Sheets

ROTATIONAL APPARATUS FOR COMMUNICATION

FIELD OF THE INVENTION

Embodiments of the present invention relate to a rotational apparatus for communication. In particular, they relate to an apparatus in which relative rotation occurs between a first housing and a second housing and a radio frequency current path between the first housing and the second housing is controlled.

BACKGROUND TO THE INVENTION

A radio communication device uses an antenna to transmit and/or receive radio waves. The operational characteristics of an antenna depend not only on the antenna itself but also the environment in which the antenna is located. The presence of conductive material adjacent the antenna may affect the operational performance of the antenna. It is sometimes useful therefore to be able to control the environment in which an antenna is located.

BRIEF DESCRIPTION OF VARIOUS EMBODIMENTS OF THE INVENTION

According to various, but not necessarily all, embodiments of the invention there is provided an apparatus comprising: a first housing comprising: a first grounded portion; and a first coupling element; and a second housing comprising: a second grounded portion; and a second coupling element, wherein the first housing and the second housing are joined at a joint that is configured to enable relative rotational movement of the first housing and the second housing; and wherein the apparatus has a first configuration in which the first housing and the second housing have been rotated to a first relative orientation at which the first coupling element and the second coupling element are aligned and a radio frequency current path is formed between the first grounded portion and the second grounded portion via the first coupling element and the second coupling element and the apparatus has a second configuration in which the first housing and the second housing have been rotated to a second relative orientation at which the first coupling element and the second coupling element are not aligned and the radio frequency current path is not formed between the first grounded portion and the second grounded portion via the first coupling element and the second coupling element.

In the first configuration, the first coupling element and the second coupling element may be aligned and galvanically connected to form the radio frequency current path.

In the first configuration, the first coupling element and the second coupling element may be aligned and form a capacitor that completes the radio frequency current path.

The apparatus may further comprise means for facilitating alignment of the first coupling element and the second coupling element. The apparatus may further comprise means for maintaining alignment of the first coupling element and the second coupling element.

The apparatus may further comprise means for providing an attractive force between the first coupling element and the second coupling element.

The apparatus may further comprise means for extending the first coupling element when the first coupling element and the second coupling element are aligned. The extension of the first coupling element may bring at least a portion of the first coupling element towards the second coupling element.

The apparatus may further comprise an electromagnetic device configured to extend the first coupling element when the first coupling element and the second coupling element are aligned. The extension of the first coupling element may bring at least a portion of the first coupling element towards the second coupling element.

The electromagnetic device may be configured to use a magnetic field to extend the first coupling element when the first coupling element and the second coupling element are in alignment. The electromagnetic device may be a permanent magnet.

The apparatus may further comprise: means for retracting the first coupling element when the first coupling element and the second coupling element move out of alignment. The retraction of the first coupling element may bring at least a portion of the first coupling element away from the second coupling element.

The apparatus may further comprise: a mechanical device configured to retract the first coupling element when the first coupling element and the second coupling element move out of alignment. The retraction of the first coupling element may bring at least a portion of the first coupling element away from the second coupling element.

The mechanical device may have a resiliently deformable device that has a natural equilibrium in a retracted state. The resiliently deformable device may be held in a deformed state while the first coupling element and the second coupling element are in alignment. The mechanical device may be a spring.

The first housing may further comprise a first additional coupling element. The apparatus may have a third configuration, different to the first configuration, in which the first housing and the second housing have been rotated to a third relative orientation, different to the first orientation, at which the first additional coupling element and the second coupling element are aligned and a radio frequency current path is formed between the first grounded portion and the second grounded portion via the first additional coupling element and the second coupling element.

The apparatus may have a fourth configuration in which the first housing and the second housing have been rotated to a fourth relative orientation, at which the first additional coupling element and the second coupling element are not aligned and the radio frequency current path is not formed between the first grounded portion and the second grounded portion via the first additional coupling element and the second coupling element. The fourth configuration may be the same as the second configuration.

The first housing may further comprise a first additional coupling element. The second housing may further comprise: a second additional coupling element.

The apparatus may have a fifth configuration, different to the first configuration, in which the first housing and the second housing have been rotated to a fifth relative orientation, different to the first orientation, at which the first additional coupling element and the second additional coupling element are aligned and a radio frequency current path is formed between the first grounded portion and the second grounded portion via the first additional coupling element and the second additional coupling element.

The apparatus may have a sixth configuration in which the first housing and the second housing have been rotated to a sixth relative orientation at which the first additional coupling element and the second additional coupling element are not aligned and the radio frequency current path is not formed between the first grounded portion and the second grounded portion via the first additional coupling element and the second additional coupling element.

The second housing may further comprise a second additional coupling element. The apparatus may have a seventh configuration, different to the first configuration, in which the first housing and the second housing have been rotated to a seventh relative orientation, different to the first orientation, at which the first additional coupling element and the second coupling element are aligned and a radio frequency current path is formed between the first grounded portion and the second grounded portion via the first additional coupling element and the second coupling element.

The apparatus may have an eighth configuration in which the first housing and the second housing have been rotated to an eighth relative orientation at which the first additional coupling element and the second coupling element are not aligned and the radio frequency current path is not formed between the first grounded portion and the second grounded portion via the first additional coupling element and the second coupling element.

The joint may form a permanent radio frequency current path between the first grounded portion and the second grounded portion. The first coupling element and the second coupling element, when aligned in the first configuration, may form a temporary radio frequency current path between the first grounded portion and the second grounded portion.

The first housing may comprise a planar display face and the joint may constrain rotation to rotation about an axis of rotation perpendicular to the plane of the planar display face.

The first housing may comprise a planar display face and the joint may constrain rotation to rotation about an axis of rotation parallel to the plane of the planar display face.

According to various, but not necessarily all, embodiments of the invention there is provided a method comprising: providing an apparatus comprising: a first housing including a first grounded portion and a first coupling element; and a second housing including a second grounded portion and a second coupling element, wherein the first housing and the second housing are joined at a joint that is configured to enable relative rotational movement of the first housing and the second housing; instructing the creation of a first configuration of the apparatus in which the first housing and the second housing have been rotated to a first relative orientation; and instructing the creation of a second configuration of the apparatus in which the first housing and the second housing have been rotated to a second relative orientation, wherein at the first configuration the first coupling element and the second coupling element are aligned and a radio frequency current path is formed between the first grounded portion and the second grounded portion via the first coupling element and the second coupling element and wherein at the second configuration the first coupling element and the second coupling element are not aligned and the radio frequency current path is not formed between the first grounded portion and the second grounded portion via the first coupling element and the second coupling element.

BRIEF DESCRIPTION OF THE DRAWINGS

For a better understanding of various examples of embodiments of the present invention reference will now be made by way of example only to the accompanying drawings in which:

FIGS. 1A, 1B and 1C & FIGS. 2A, 2B and 2C schematically illustrates an apparatus 10 comprising: a first housing 2 and a second housing 12 interconnected via a joint 20.

DETAILED DESCRIPTION OF VARIOUS EMBODIMENTS OF THE INVENTION

The Figures schematically illustrate an apparatus 10 comprising: a first housing 2 comprising a first grounded portion 4 and a first coupling element 6; and a second housing 12 comprising a second grounded portion 14 and a second coupling element 16, wherein the first housing 2 and the second housing 12 are joined at a joint 20 that is configured to enable relative rotational movement 22 of the first housing 2 and the second housing 12; and wherein the apparatus 10 has a first configuration (FIGS. 2A, 2B, 2C, 4A, 4B, 5A, 5B, 8A) in which the first housing 2 and the second housing 12 have been rotated to a first relative orientation at which the first coupling element 6 and the second coupling element 16 are aligned and a radio frequency current path 30 is formed between the first grounded portion 4 and the second grounded portion 14 via the first coupling element 6 and the second coupling element 16 and the apparatus has a second configuration (FIGS. 1A, 1B, 1C, 3A, 8B) in which the first housing 2 and the second housing 12 have been rotated to a second relative orientation at which the first coupling element 6 and the second coupling element 16 are not aligned and a radio frequency current path 30 is not formed between the first grounded portion 4 and the second grounded portion 14 via the first coupling element 6 and the second coupling element 16.

The joint 20 is configured to enable relative rotational movement 22 of the first housing 2 and the second housing 12.

In one example embodiment of the joint 20, for example as illustrated in FIGS. 1A-1C and 2A-2C, is a swivel. The first housing 2 and the second housing 12 have dimensions of length, width and depth with the depth having the smallest size. The swivel joint 20 constrains rotation to rotation about an axis of rotation 5 that is parallel to the depth dimension and perpendicular to the length and width dimensions.

Figure 8A:
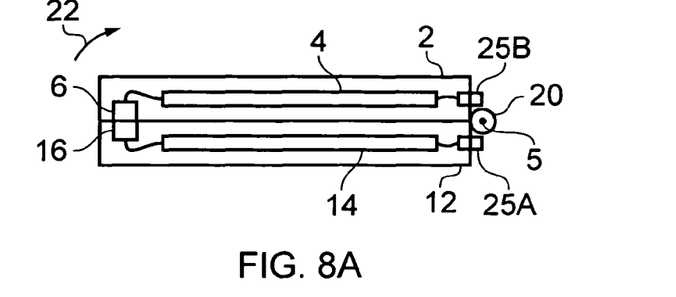
FIGS. 8A and 8B schematically illustrate a different implementation of the apparatus in which the joint is a hinge and the apparatus is a foldable apparatus.
Figure 8B:
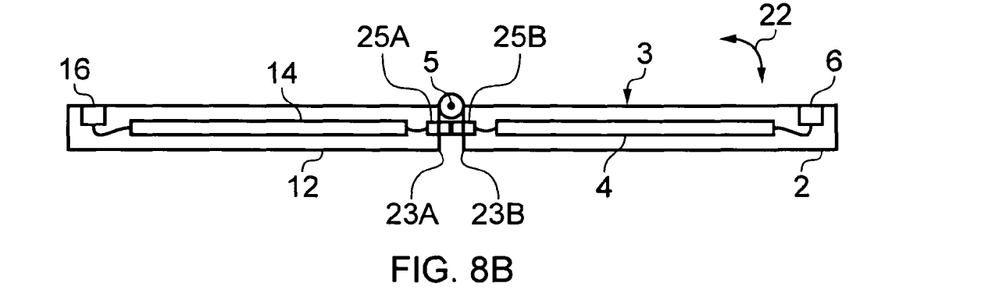

In a further example embodiment of the joint 20, for example as illustrated in FIGS. 8A and 8B, is a hinge. The first housing 2 and the second housing 12 have dimensions of length, width and depth with the depth having the smallest size. The hinge joint 20 constrains rotation to rotation about an axis of rotation 5 that is perpendicular to the depth dimension and parallel to a plane defined by the length and width dimensions. In the example of FIGS. 8A and 8B it is parallel to the width dimension.

The apparatus 10 is a radio communications apparatus. That is, an apparatus that is capable of receiving and/or transmitting radio signals for the purpose of communicating information. Radio communication may be a primary or important purpose of the apparatus 10 or it may be a subsidiary purpose or one of many purposes of the apparatus 10.

The radio apparatus 10 may operate as a radio receiver, or a radio transmitter or a radio transceiver.

Figure 10:
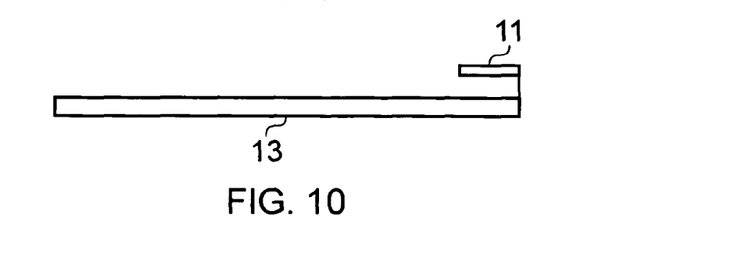
FIG. 10 schematically illustrates an antenna arrangement.

The apparatus 10 has for the purpose of radio communication one or more antennas 11. An example of an antenna is illustrated in FIG. 10. This Fig illustrates a monopole antenna 11 that couples with an adjacent 'ground plane' 13. The ground plane is a grounded conductive body. The monopole antenna 11 is capable of creating an electric current flow within the ground plane 13. The nature of this current flow determines the operational characteristics of the antenna 11. The antenna 11 may be, for example, a planar inverted antenna. It may, for example, be directly or indirectly fed. It may, for example, be a planar inverted F antenna or a planar inverted L antenna.

The ground plane 13 is not a unitary body but is formed from the first grounded portion 4 and the second grounded portion 14 when a radio frequency current path 30 is formed between the first grounded portion 4 and the second grounded portion 14 via the first coupling element 6 and the second coupling element 16. More complex ground plane arrangements may also be possible in alternative embodiments where more than two grounded portions may be arranged to form the ground plane.

The first grounded portion 4 may be provided by a printed circuit/wiring board (PCB, PWB) that includes a grounded conductive layer. The second grounded portion 14 may be provided by a printed circuit/wiring board (PCB, PWB) that includes a grounded conductive layer. The radio frequency current path 30 is formed between those conductive layers. One or more of the grounded portions may also be provided by other components or modules of the apparatus 10. For example, the first grounded portion 4 may be provided by a conductive cover which forms the exterior and/or interior shell or casing of the apparatus 10. Alternatively, other conductive components may be used, for example, parts of the battery, display frames, shielding components, etc.

The operational characteristics of the antenna 11 determine its operational bandwidth. Operational bandwidth is a frequency range over which an antenna can efficiently operate. Efficient operation occurs, for example, when the antenna's insertion loss S11 is greater than an operational threshold such as 4 dB or 6 dB.

The radio frequency current path 30 formed between the first grounded portion 4 and the second grounded portion 14 via the first coupling element 6 and the second coupling element 16 may improve current distribution by, for example, making it more uniform, may increase efficiency, and may increase bandwidth.

The antenna 11 may be, for example, have one or more operational bandwidths including one or more of: AM radio (0.535-1.705 MHz); FM radio (76-108 MHz); Bluetooth (2400-2483.5 MHz); WLAN (2400-2483.5 MHz); HLAN (5150-5850 MHz); GPS (1570.42-1580.42 MHz); US-GSM 850 (824-894 MHz); EGSM 900 (880-960 MHz); EU-WCDMA 900 (880-960 MHz); PCN/DCS 1800 (1710-1880 MHz); US-WCDMA 1900 (1850-1990 MHz); WCDMA 2100 (Tx: 1920-1980 MHz Rx: 2110-2180 MHz); PCS1900 (1850-1990 MHz); UWB Lower (3100-4900 MHz); UWB Upper (6000-10600 MHz); DVB-H (470-702 MHz); DVB-H US (1670-1675 MHz); DRM (0.15-30 MHz); Wi Max (2300-2400 MHz, 2305-2360 MHz, 2496-2690 MHz, 3300-3400 MHz, 3400-3800 MHz, 5250-5875 MHz); DAB (174.928-239.2 MHz, 1452.96-1490.62 MHz); RFID LF (0.125-0.134 MHz); RFID HF (13.56-13.56 MHz); RFID UHF (433 MHz, 865-956 MHz, 2450 MHz); LTE 700 (US) (698.0-716.0 MHz, 728.0-746.0 MHz), LTE 1500 (Japan) (1427.9-1452.9 MHz, 1475.9-1500.9 MHz), LTE 2600 (Europe) (2500-2570 MHz, 2620-2690 MHz).

FIGS. 1A, 1B and 1C & FIGS. 2A, 2B and 2C schematically illustrates an apparatus 10 comprising: a first housing 2 and a second housing 12 interconnected via a joint 20.

Figure 1A:
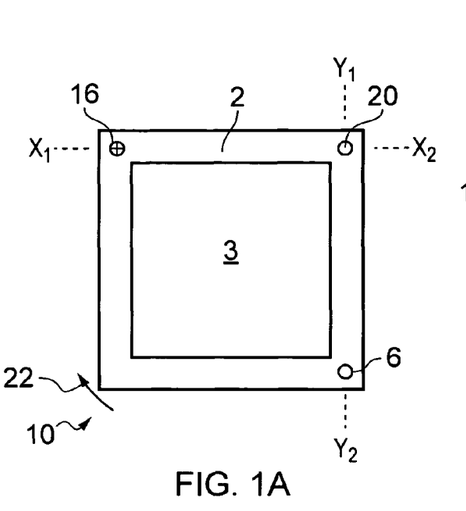
FIG. 1A illustrates in plan view an apparatus when it is in a compact configuration.
Figure 1B:
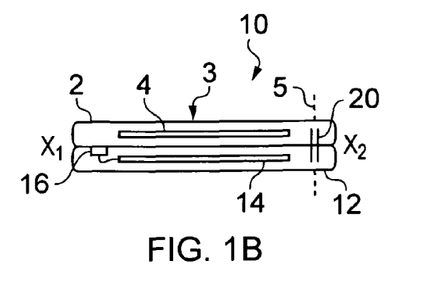
FIG. 1B illustrates using a cross-sectional view along the line X1-X2, the apparatus illustrated in FIG. 1A.
Figure 1C:
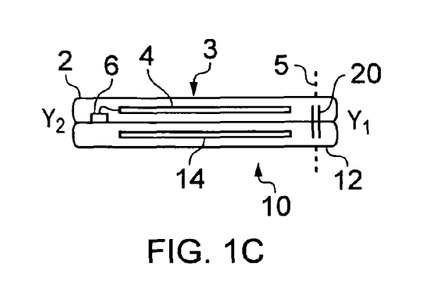
FIG. 1C illustrates using a cross-sectional view along the line Y1-Y2, the apparatus illustrated in FIG. 1A.

FIG. 1A illustrates in plan view the apparatus 10 when it is in a compact configuration. FIG. 1B illustrates using a cross-sectional view along the line X1-X2, the apparatus 10 illustrated in FIG. 1A. FIG. 1C illustrates using a cross-sectional view along the line Y1-Y2, the apparatus 10 illustrated in FIG. 1A.

Figure 2A:
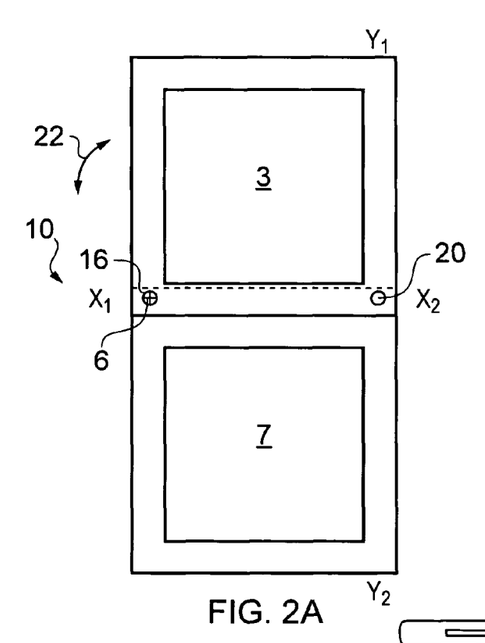
FIG. 2A illustrates in plan view the apparatus when it is in an extended configuration.
Figure 2B:
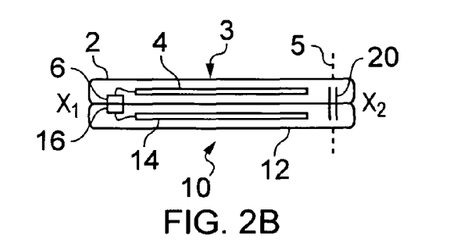
FIG. 2B illustrates using a cross-sectional view along the line X1-X2, the apparatus illustrated in FIG. 2A.
Figure 2C:
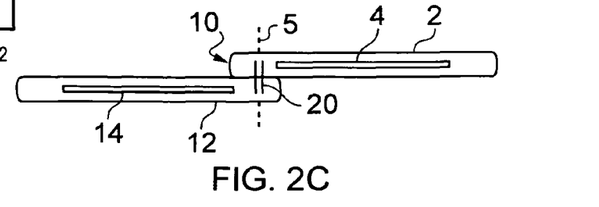
FIG. 2C illustrates using a cross-sectional view along the line Y1-Y2, the apparatus illustrated in FIG. 2A.

FIG. 2A illustrates in plan view the apparatus 10 when it is in an extended configuration. FIG. 2B illustrates using a cross-sectional view along the line X1-X2, the apparatus 10 illustrated in FIG. 2A. FIG. 2C illustrates using a cross-sectional view along the line Y1-Y2, the apparatus 10 illustrated in FIG. 2A.

The first housing 2 and the second housing 12 have dimensions of length, width and depth. Referring to FIGS. 1A and 2A length extends down the page, width extends across the page and depth extends into the page. The depth dimension is the smallest size as is apparent from FIGS. 1B, 1C, 2B and 2C.

The swivel joint 20 enables relative rotational movement 22 of the first housing 2 and the second housing 12. The swivel joint 20 constrains rotation to rotation about an axis of rotation 5 that is parallel to the depth dimension and perpendicular to the length and width dimensions. It may be described as a two-dimensional or planar or constrained swivel joint because of this constraint.

In the illustrated example, the first housing 2 is swiveled through 90 degrees (clockwise) between the compact configuration (FIG. 1A-1C) and the extended configuration (FIG. 2A-2C). The extended configuration has a greater length dimension than the compact configuration. That is, it is a lengthwise extended configuration.

In the illustrated example, the first housing 2 has a length dimension that is substantially equal to its width dimension i.e. it is substantially square in plan view. Consequently, swiveling the first housing 2 through 90 degrees (clockwise) does not change the width dimension of the apparatus 10 but extends the length dimension. That is, the extended configuration is not widthwise.

The constrained rotation of the first housing 2 to rotation about the axis of rotation 5 to a plane parallel to the length and width dimensions and perpendicular to the width dimension means that swiveling the first housing 2 through 90 degrees (clockwise) does not change the depth dimension of the apparatus 10 but extends the length dimension. That is the extended configuration is not depth wise.

In the compact configuration the first housing 2 and the second housing 12 have a relative orientation at which the first coupling element 6 and the second coupling element 16 are not aligned. A radio frequency current path 30 is not formed between the first grounded portion 4 and the second grounded portion 14 via the first coupling element 6 and the second coupling element 16.

In the extended configuration the first housing 2 and the second housing 12 have a relative orientation at which the first coupling element 6 and the second coupling element 16 are aligned. A radio frequency current path 30 is formed between the first grounded portion 4 and the second grounded portion 14 via the first coupling element 6 and the second coupling element 16.

In the example illustrated in FIGS. 1A-1C and 2A-2C, the first housing 2 and the second housing 12 have substantially the same length and width dimensions and are both substantially square. In the compact configuration, the first housing 2 overlies the second housing 12 and the square perimeter edge of the first housing 2 is in register with the square perimeter edge of the second housing 12. The swivel 20 is placed 'off-centre' away from the common centre of the squares in the compact configuration along an axis of reflection symmetry. In this example, the swivel is placed on the diagonal of the square towards a corner of the square. To form the extended configuration, the first housing 2 is swiveled by 90 degrees. The first housing 2 is a square and has 90 degree rotational symmetry, so rotating the first housing 2 by 90 degrees extends the length of the apparatus 2 but maintains the width of the apparatus 10.

The upper face of the first housing 2 is swiveled but is not otherwise rotated. The upper face of the housing may, for example, provide a display. The orientation of the display changes by 90 degrees between the compact configuration and the extended configuration.

The apparatus 10 may comprise a controller that detects the change in configuration of the apparatus 10 and changes the orientation of information displayed on the display. The controller may, for example, cause the image to be rotated through 90 degrees (anticlockwise) as a consequence of the first housing 2 being rotated 90 degrees clockwise so that the orientation of the image displayed remains stationary despite rotation of the display.

The controller may detect the change in configuration of the apparatus using, for example, a mechanical switch or, for example, determining when a radio frequency current path 30 is formed between the first grounded portion 4 and the second grounded portion 14 using, for example, an impedance detector that detects the electrical impedance of the first grounded portion 4 or the second grounded portion 14.

Implementation of the controller can be in hardware alone (a circuit, a processor . . . ), have certain aspects in software including firmware alone or can be a combination of hardware and software (including firmware).

The controller may be implemented using instructions that enable hardware functionality, for example, by using executable computer program instructions in a general-purpose or special-purpose processor that may be stored on a computer readable storage medium (disk, memory etc) to be executed by such a processor.

The processor may be configured to read from and write to a memory that stores a computer program comprising computer program instructions that control the operation of the apparatus 10 when loaded into the processor. The processor by reading the memory is able to load and execute the computer program.

The computer program may arrive at the apparatus via any suitable delivery mechanism. The delivery mechanism may be, for example, a computer-readable storage medium, a computer program product, a memory device, a record medium such as a CD-ROM or DVD, an article of manufacture that tangibly embodies the computer program. The delivery mechanism may be a signal configured to reliably transfer the computer program. The apparatus 10 may propagate or transmit the computer program as a computer data signal.

The memory may be implemented as one or more separate components some or all of which may be integrated/removable and/or may provide permanent/semi-permanent/dynamic/cached storage.

In an alternative arrangement of the apparatus 10 (not illustrated), the first housing 2 and the second housing 12, in the compact configuration, have substantially the same length dimension and substantially the same width dimension and are both substantially rectangular. In the compact configuration, the first housing 2 overlies the second housing 12 and the rectangular edge of the first housing 2 is in register with the rectangular edge of the second housing 12. The swivel 20 is placed 'off-centre' away from the common centre of the rectangles in the compact configuration along an axis of reflection symmetry. In this example, the swivel is placed on an axis that bisects the rectangle and runs in the length direction and towards an edge of the rectangle. To form the extended configuration, the first housing 2 is swiveled by 180 degrees. The first housing 2 is a rectangle and has 180 degree rotational symmetry, so rotating the first housing 2 by 180 degrees extends the length of the apparatus 2 but maintains the width of the apparatus 10.

The upper face of the first housing 2 is swiveled but is not otherwise rotated. The upper face of the housing may, for example, provide a display. The orientation of the display changes by 180 degrees between the compact configuration and the extended configuration.

The apparatus 10 may comprise a controller that detects the change in configuration of the apparatus 10 and changes the orientation of information displayed on the display. The controller may, for example, cause the image to be rotated through 180 degrees (anticlockwise) as a consequence of the first housing 2 being rotated 180 degrees clockwise so that the orientation of the image displayed remains stationary despite rotation of the display.

The controller may detect the change in configuration of the apparatus as previously described and be implemented as previously described.

Although this alternative arrangement has been described with reference to a rectangle shape it should be appreciated that it is also relevant for a square shape. Further alternative arrangements may also be possible with housings having shapes other than a square or a rectangle including artistic and curved shapes.

In a further alternative arrangement of the apparatus 10 (not illustrated), the first housing 2 and the second housing 12, in the compact configuration, have substantially the same length and width dimensions and are both substantially square. In one configuration, the first housing 2 overlies the second housing 12 and the square edge of the first housing 2 is in register with the square edge of the second housing 12. The swivel 20 is placed 'at-centre' over the common centre of the squares. To form a new configuration, the first housing 2 is swiveled by 90, 180 or 270 degrees. The first housing 2 is a square and has 4×90 degree rotational symmetry. A radio frequency current path 30 may be formed between the first grounded portion 4 and the second grounded portion 14 via the first coupling element 6 and the second coupling element 16 when the first housing is swiveled by one or more of 90, 180, 270 degrees. The different radio frequency current paths formed at different orientations of the first housing may be between the same or different combinations of grounded portions so that the operational characteristics of the antenna may be controlled by rotating the first housing.

The apparatus 10 may comprise a controller (as previously described) that reorients an image displayed by a display to compensate for rotation of the display with the first housing 2.

It should be appreciated that in this further alternative arrangement, although rotation of the first housing changes the configuration of the apparatus 2 the configurations are not relatively extended or compact.

Figure 3A:
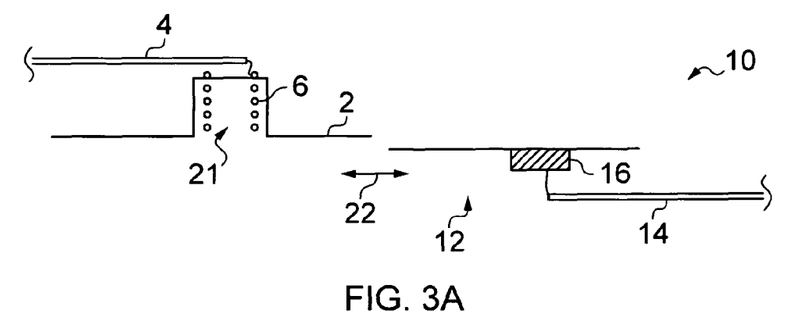
FIG. 3A illustrates a first coupling element and a second coupling element when not aligned.
Figure 4A:
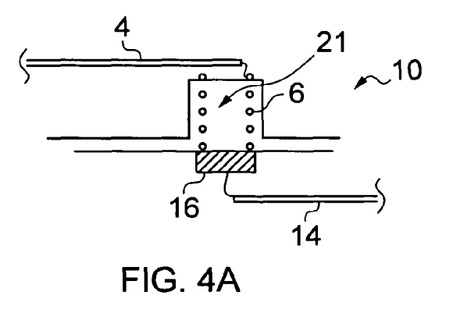
FIG. 4A illustrates a first coupling element and a second coupling element when aligned and in contact.
Figure 5A:
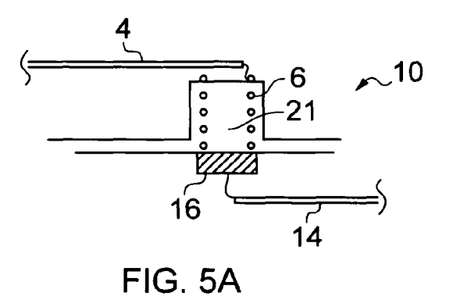
FIG. 5A illustrates a first coupling element and a second coupling element when aligned and in close proximity but not in direct galvanic contact.

FIGS. 3A, 4A, and 5A schematically illustrate an example of a particular implementation of the first coupling element 6 and the second coupling element 16.

In FIG. 3A, the first coupling element 6 and the second coupling element 16 are not aligned and a radio frequency current path 30 is not formed between the first grounded portion 4 and the second grounded portion 14 via the first coupling element 6 and the second coupling element 16.

In FIGS. 4A and 5A, the first coupling element 6 and the second coupling element 16 are aligned and a radio frequency current path 30 is formed between the first grounded portion 4 and the second grounded portion 14 via the first coupling element 6 and the second coupling element 16.

In FIG. 4A the radio frequency current path 30 is completed by a galvanic connection between the first coupling element 6 and the second coupling element 16 where they make direct contact. The equivalent circuit is illustrated in FIG. 4B.

Figure 5B:
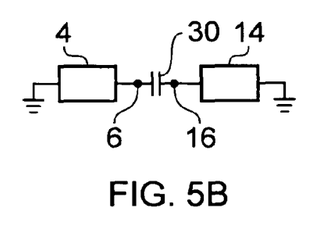
FIG. 5B illustrates the equivalent electrical circuit for FIG. 5A.

In FIG. 5A the radio frequency current path 30 is completed by capacitive coupling between the first coupling element 6 and the second coupling element 16 where they are close but do not make direct contact. The equivalent circuit is illustrated in FIG. 5B.

In FIG. 3A, when the first coupling element 6 and the second coupling element 16 are out of alignment, the first coupling element 6 is in a retracted configuration. The first coupling element 6 is retracted into a recess 21 which obviates interference by the first coupling element 6 with relative movement of the first housing 2 and the second housing 12.

Figure 4B:
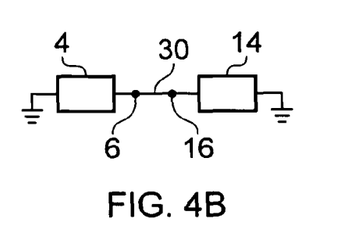
FIG. 4B illustrates the equivalent electrical circuit for FIG. 4A.

In FIGS. 4A and 4B, when the first coupling element 6 and the second coupling element 16 are in alignment, the first coupling element 6 is in an extended position.

As a consequence of the first coupling element 6 and the second coupling element 16 being moved into alignment, the first coupling element 6 automatically changes its configuration from the retracted configuration to the extended configuration. The retraction of the first coupling element 6 moves at least a portion of the first coupling element 6 away from the second coupling element 16.

As a consequence of the first coupling element 6 and the second coupling element 16 being moved out of alignment, the first coupling element 6 automatically changes its configuration from the extended configuration to the retracted configuration. The extension of the first coupling element 6 moves at least a portion of the first coupling element 6 towards the second coupling element 16.

Any suitable means, whether mechanical and/or electromagnetic, may be used to retract the first coupling element 6. As an example, a mechanical device may be configured to retract the first coupling element 6 when the first coupling element 6 and the second coupling element 16 move out of alignment.

In the example illustrated the mechanical device is a resiliently deformable device that has a natural equilibrium at a retracted state and is held in a deformed state while the first coupling element 6 and the second coupling element 16 are in alignment. In the illustrated example, the mechanical device is a helical spring and an end portion of the conductive helical spring provides the first coupling element 6. However, other mechanical devices may be used such as a spiraled spring, a concertina-like element, or other resiliently mounted devices such as a roller ball, a cylinder, etc.

Any suitable means, whether mechanical and/or electromagnetic, may be used to extend the first coupling element 6. As an example, an electromagnetic device may be configured to extend the first coupling element 6 when the first coupling element 6 and the second coupling element 16 are aligned.

In the example illustrated the electromagnetic device produces an attractive force on the resiliently deformable device and holds the resiliently deformable device in the deformed state while the first coupling element 6 and the second coupling element 16 are in alignment. In the illustrated example, the electromagnetic device is a permanent magnet that attracts the ferromagnetic helical spring. However, in other implementations the electromagnetic device may be for example a solenoid configured to create a magnetic field to extend the first coupling element 6 when the first coupling element 6 and the second coupling element 16 are in alignment.

The use of a localized attractive force between the first coupling element 6 and the second coupling element 16 when they are in alignment has certain advantages. As the first coupling element 6 and the second coupling element 16 are moved towards alignment, when they become sufficiently close, the attractive force facilitates alignment. The attractive force also maintains alignment. The attractive force is sufficiently strong to extend the first coupling element 6 but is sufficiently weak to allow the first coupling element 6 and the second coupling element 16 to be separated when the first housing 2 is rotated relative to the second housing 12.

Figure 6:
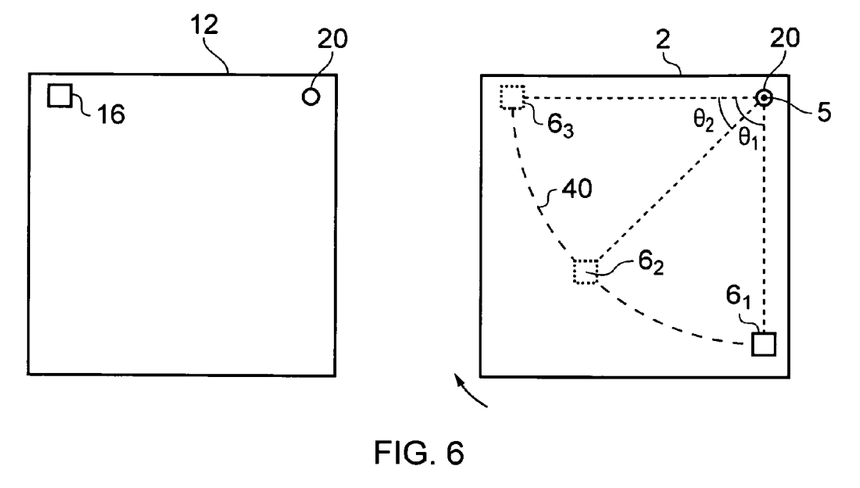
FIG. 6 schematically illustrates an apparatus that has a plurality of first coupling elements.

FIG. 6 schematically illustrates an embodiment in which a plurality of first coupling elements $6_1$, $6_2$, $6_3$, are provided. The lower level of the apparatus 10, the second housing 12 is illustrated to the left. The upper level of the apparatus 10, the first housing 2 is illustrated to the right.

A series of first coupling elements $6_1$, $6_2$, $6_3$ are arranged along a circular arc 40 centered at the axis 5 at respective angles $\theta_1$, $\theta_2$, $\theta_3$. $\theta_3$ is zero in FIG. 6 and is consequently not labeled. Each of the first coupling elements $6_n$ has a polar co-ordinate $(R, \theta_n)$ where R is the radius of the circular arc and the distance of the second coupling element 16 from the axis 5. When the first housing is rotated by an amount $\theta_n$ from the compact orientation, the first coupling element $6_n$ and the second coupling element 16 are aligned and a radio frequency current path is formed between the first grounded portion 4 and the second grounded portion 14 via the first coupling element $6_n$ and the second coupling element 16 but not otherwise.

In some implementations different radio frequency current paths may be formed between the same or different grounded portions in the first and second housings.

Figure 7:
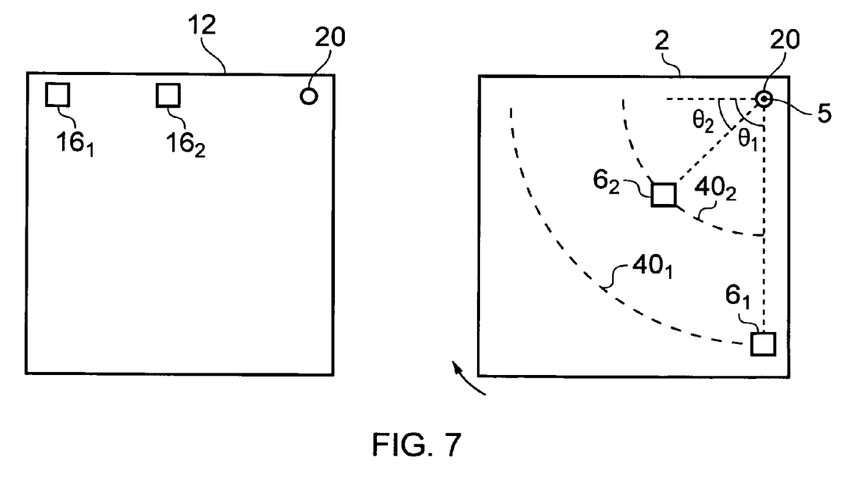
FIG. 7 schematically illustrates an embodiment in which a plurality of first coupling elements and a plurality of second coupling elements are provided.

FIG. 7 schematically illustrates an embodiment in which a plurality of first coupling elements $6_1$, $6_2$, and a plurality of second coupling elements $16_1$, $16_2$, are provided. The lower level of the apparatus 10, the second housing 12 is illustrated to the left. The upper level of the apparatus 10, the first housing 2 is illustrated to the right.

A plurality of first coupling elements $6_1$, $6_2$ are arranged along one or more circular arcs 40 centered at the axis 5 at respective angles $\theta_1$, $\theta_2$. Each of the first coupling elements $6_n$ has a polar co-ordinate ($R_n$, $\theta_n$) where $R_n$ is the radius of the circular arc.

A plurality of second coupling elements $16_1$, $16_2$ are arranged along one or more circular arcs 40 centered at the axis 5 at angles respective angles $\beta_1$, $\beta_2$, $\beta_3$. Each of the second coupling elements 16, has a polar co-ordinate ($R_n$, $\beta_n$) where $R_n$ is the radius of the circular arc.

Each first coupling element 6 may have the same radius $R_n$ and one or more second coupling elements 16.

Each second coupling element 16 may have the same radius $R_n$ and one or more second coupling elements 6.

If the first coupling element 6 at polar co-ordinate ($R''$, $\theta_n$) shares the same radius $R_n$ with a second coupling element 16 at polar co-ordinate ($R_n$, $\beta_n$), then those first and second coupling elements are aligned when the first housing is rotated by an amount $\theta_n$ minus $\beta_n$ from the compact orientation and a radio frequency current path is formed between the first grounded portion 4 and the second grounded portion 14 via those first and second coupling elements.

In some implementations the radio frequency current paths formed as a consequence of the alignment of different first and second coupling elements may be between the same or different grounded portions in the first and second housings.

FIGS. 8A and 8B schematically illustrate a different implementation of the apparatus 10. In this implementation the joint 20 is a hinge and the apparatus is a foldable apparatus. The first housing 2 and the second housing 12 have dimensions of length, width and depth with the depth having the smallest size. The swivel joint 20 constrains rotation to rotation about an axis of rotation 5 that is perpendicular to the depth dimension and parallel to a plane defined by the length and width dimensions. In the example of FIGS. 8A and 8B it is parallel to the width dimension (into the page).

When the apparatus 10 is in the closed, compact configuration (FIG. 8A), the first housing 2 and the second housing 12 have been rotated to a first relative orientation at which the first coupling element 6 and the second coupling element 16 are aligned and a radio frequency current path 30 is formed between the first grounded portion 4 and the second grounded portion 14 via the first coupling element 6 and the second coupling element 16.

When the apparatus 10 is in the open, extended configuration (FIG. 8B), the first housing 2 and the second housing 12 have been rotated to a second relative orientation at which the first coupling element 6 and the second coupling element 16 are not aligned and a radio frequency current path 30 is not formed between the first grounded portion 4 and the second grounded portion 14 via the first coupling element 6 and the second coupling element 16.

It may also be possible or advantageous to have a second coupling point sited at the hinge area. In one embodiment, a third coupling element and a fourth coupling element may be parts of the hinge 4 that are brought into alignment when the apparatus 10 is open and out of alignment when the apparatus 10 is closed. In another alternative embodiment, the third coupling element 25B and the fourth coupling element 25A may be exposed on respective exterior surfaces of the first housing 2 and the second housing 12. The exterior surfaces may be the end walls 23A, 23B of the first housing 2 and second housing 12 which are brought together, by rotation of the respective housings about the hinge, when the apparatus 10 is opened.

Thus, when the apparatus 10 is in the closed, compact configuration (FIG. 8A), the first housing 2 and the second housing 12 have been rotated to a first relative orientation at which a third coupling element and a fourth coupling element are not aligned and connected and a radio frequency current path is not formed between the first grounded portion 4 and the second grounded portion 14 via the third coupling element 25B and the fourth coupling element 25A. In this compact configuration the first coupling element 6 and the second coupling element 16 may be aligned and a radio frequency current path formed between the first grounded portion 4 and the second grounded portion 14 via the first coupling element 6 and the second coupling element 16, as illustrated in FIG. 8A.

When the apparatus 10 is in the open, extended configuration (FIG. 8B), the first housing 2 and the second housing 12 have been rotated to a second relative orientation at which the third coupling element and the fourth coupling element are aligned and a radio frequency current path is formed between the first grounded portion 4 and the second grounded portion 14 via the third and fourth coupling elements 25B, 25A. In this extended configuration, the first coupling element 6 and the second coupling element 16 are not aligned and a radio frequency current path is not formed between the first grounded portion 4 and the second grounded portion 14 via the first coupling element 6 and the second coupling element 16, as illustrated in FIG. 8B.

The first coupling element 6 may be positioned at a first non-hinged end of the first ground portion 4 and the third coupling element 25B may be positioned at a second hinged end of the first ground portion 4. The second coupling element 16 may be positioned at a first non-hinged end of the second ground portion 14 and the fourth coupling element may be positioned at a second hinged end of the first ground portion 4. This gives the advantage that the first ground portion 4 and the second ground portion 14 are connected, but connected via different current paths, in the open and closed configurations.

Different intermediate components (for example, electrical and/or mechanical switches, inductors and/or capacitors) may be present in the different current paths. For example, intermediate components may be inserted at the first coupling element 6 but at no other coupling element so that they are included in the current path created by the first and second coupling elements but are not included in the current path created by the third and fourth coupling elements.

It is also be possible to place the first coupling element 6 and the second coupling element 16 inside the hinge 20 so that an RF current path is formed in the open configuration and not formed in the closed configuration.

Figure 9:
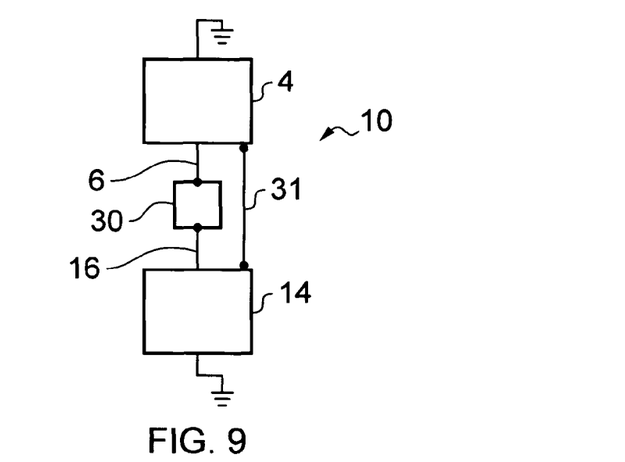
FIG. 9 illustrates, using an equivalent electrical circuit, an embodiment in which there is a permanent current path between the first and second housings.

Referring to FIG. 9, there is illustrated a schematic illustration of a further embodiment which is applicable to any one of the preceding described embodiments or implementations.

In this embodiment, the joint 20 forms at least one permanent radio frequency current path 31 between the first grounded portion 4 and the second grounded portion 14. The first coupling element and the second coupling element, when aligned in the first configuration, form a temporary radio frequency current path 30 between the first grounded portion 4 and the second grounded portion 14. Sufficient physical separation between the permanent current path and the temporary current path across the junction or interface between the first housing 2 and the second housing 12 provides more even distribution of the electric current.

In the first configuration a radio frequency current path 30 is formed between the first grounded portion 4 and the second grounded portion 14 via the aligned first coupling element 6 and second coupling element 16 and additionally a permanent radio frequency current path 31 exists between the first grounded portion 4 and the second grounded portion 14 via the joint 20.

In the second configuration a radio frequency current path 30 is not formed between the first grounded portion 4 and the second grounded portion 14 via the (non-aligned) first coupling element 6 and second coupling element 16 but a permanent radio frequency current path 31 exists between the first grounded portion 4 and the second grounded portion 14 via the joint 20.

Features illustrated in the Figures as interconnected may instead be operationally coupled and any number or combination of intervening elements can exist (including no intervening elements).

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a first housing comprising:
      a first grounded portion; and
      a first coupling element; and
   a second housing comprising:
      a second grounded portion; and
      a second coupling element,
   wherein the first housing and the second housing are joined at a joint that is configured to enable relative rotational movement of the first housing and the second housing; and
   wherein the apparatus has a first configuration in which the first housing and the second housing have been rotated to a first relative orientation at which the first coupling element and the second coupling element are aligned and a radio frequency current path is formed between the first grounded portion and the second grounded portion via the first coupling element and the second coupling element and
   the apparatus has a second configuration in which the first housing and the second housing have been rotated to a second relative orientation at which the first coupling element and the second coupling element are not aligned and the radio frequency current path is not formed between the first grounded portion and the second grounded portion via the first coupling element and the second coupling element.

2. An apparatus as claimed in claim 1, wherein in the first configuration the first coupling element and the second coupling element are aligned and galvanically connect to form the radio frequency current path.

3. An apparatus as claimed in claim 1, wherein in the first configuration the first coupling element and the second coupling element are aligned and form a capacitor that completes the radio frequency current path.

4. An apparatus as claimed in claim 1, further comprising means for extending the first coupling element when the first coupling element and the second coupling element are aligned, wherein the extension of the first coupling element brings at least a portion of the first coupling element towards the second coupling element.

5. An apparatus as claimed in claim 1, further comprising an electromagnetic device configured to extend the first coupling element when the first coupling element and the second coupling element are aligned, wherein the extension of the first coupling element brings at least a portion of the first coupling element towards the second coupling element.

6. An apparatus as claimed in claim 5, wherein the electromagnetic device is configured to use a magnetic field to extend the first coupling element when the first coupling element and the second coupling element are in alignment.

7. An apparatus as claimed in claim 5, wherein the electromagnetic device is a permanent magnet.

8. An apparatus as claimed in claim 1 further comprising: means for retracting the first coupling element when the first coupling element and the second coupling element move out of alignment, wherein the retraction of the first coupling element brings at least a portion of the first coupling element away from the second coupling element.

9. An apparatus as claimed in claim 1 further comprising: a mechanical device configured to retract the first coupling element when the first coupling element and the second coupling element move out of alignment, wherein the retraction of the first coupling element brings at least a portion of the first coupling element away from the second coupling element.

10. An apparatus as claimed in claim 9, wherein the mechanical device has a resiliently deformable device that has a natural equilibrium in a retracted state and is held in a deformed state while the first coupling element and the second coupling element are in alignment.

11. An apparatus as claimed in claim 9, wherein the mechanical device is a spring.

12. An apparatus as claimed in claim 1, wherein the first housing further comprises a first additional coupling element, wherein the apparatus has a third configuration, different to the first configuration, in which the first housing and the second housing have been rotated to a third relative orientation, different to the first orientation, at which the first additional coupling element and the second coupling element are aligned and a radio frequency current path is formed between the first grounded portion and the second grounded portion via the first additional coupling element and the second coupling element and the apparatus has a fourth configuration in which the first housing and the second housing have been rotated to a fourth relative orientation at which the first additional coupling element and the second coupling element are not aligned and the radio frequency current path is not formed between the first grounded portion and the second grounded portion via the first additional coupling element and the second coupling element.

13. An apparatus as claimed in claim 12, wherein the fourth configuration is the same as the second configuration.

14. An apparatus as claimed in claim 1, wherein the first housing further comprises: a first additional coupling element and
   the second housing further comprises: a second additional coupling element and wherein the apparatus has a fifth configuration, different to the first configuration, in which the first housing and the second housing have been rotated to a fifth relative orientation, different to the first orientation, at which the first additional coupling element and the second additional coupling element are aligned and a radio frequency current path is formed between the first grounded portion and the second grounded portion via the first additional coupling element and the second additional coupling element and the apparatus has a sixth configuration in which the first housing and the second housing have been rotated to a sixth relative orientation at which the first additional coupling element and the second additional coupling element are not aligned and the radio frequency current path is not formed between the first grounded portion and the second grounded portion via the first additional coupling element and the second additional coupling element.

15. An apparatus as claimed in claim 1, wherein the second housing further comprising: a second additional coupling element wherein the apparatus has a seventh configuration, different to the first configuration, in which the first housing and the second housing have been rotated to a seventh relative orientation, different to the first orientation, at which the first additional coupling element and the second coupling element are aligned and a radio frequency current path is formed between the first grounded portion and the second grounded portion via the first additional coupling element and the second coupling element and the apparatus has an eighth configuration in which the first housing and the second housing have been rotated to an eighth relative orientation at which the first additional coupling element and the second coupling element are not aligned and the radio frequency current path is not formed between the first grounded portion and the second grounded portion via the first additional coupling element and the second coupling element.

16. An apparatus as claimed in claim 1 wherein the joint forms a permanent radio frequency current path between the first grounded portion and the second grounded portion and the first coupling element and the second coupling element, when aligned in the first configuration, form a temporary radio frequency current path between the first grounded portion and the second grounded portion.

17. An apparatus as claimed in claim 1 wherein the first housing comprises a planar display face and the joint constrains rotation to rotation about an axis of rotation perpendicular to the plane of the planar display face.

18. An apparatus as claimed in claim 1 wherein the first housing comprises a planar display face and the joint constrains rotation to rotation about an axis of rotation parallel to the plane of the planar display face.

19. A method comprising:

providing an apparatus comprising: a first housing including a first grounded portion and a first coupling element; and a second housing including a second grounded portion and a second coupling element, wherein the first housing and the second housing are joined at a joint that is configured to enable relative rotational movement of the first housing and the second housing;

instructing the creation of a first configuration of the apparatus in which the first housing and the second housing have been rotated to a first relative orientation; and instructing the creation of a second configuration of the apparatus in which the first housing and the second housing have been rotated to a second relative orientation, wherein at the first configuration the first coupling element and the second coupling element are aligned and a radio frequency current path is formed between the first grounded portion and the second grounded portion via the first coupling element and the second coupling element and wherein at the second configuration the first coupling element and the second coupling element are not aligned and the radio frequency current path is not formed between the first grounded portion and the second grounded portion via the first coupling element and the second coupling element.

* * * * *